United States Patent [19]
Yonce

[11] 3,971,456
[45] July 27, 1976

[54] HANDLE-RUNG MODULE

[76] Inventor: Everett R. Yonce, 464 42nd St., Oakland, Calif. 94609

[22] Filed: Apr. 10, 1975

[21] Appl. No.: 566,952

[52] U.S. Cl. ............................... 182/90; 280/163
[51] Int. Cl.² .......................................... B60R 3/00
[58] Field of Search............. 182/90, 228; 16/111 R, 16/110 R, 114; 312/320; 280/163, 164 R, 164 A

[56] References Cited
UNITED STATES PATENTS

| | | | |
|---|---|---|---|
| 1,505,015 | 8/1924 | Dunlap | 182/90 |
| 1,760,200 | 5/1930 | Large | 182/90 |
| 1,916,252 | 7/1933 | Boardman | 182/90 |
| 2,580,326 | 12/1951 | Stvens | 182/90 |
| 2,603,821 | 7/1952 | Bacon | 16/111 R |

Primary Examiner—Reinaldo P. Machado
Attorney, Agent, or Firm—Theodore J. Bielen, Jr.; Richard Esty Peterson

[57] ABSTRACT

A handle-rung module adapted to be secured to a mounting surface to provide a handle and/or rung which is recessed and substantially flush with the mounting surface, the module is installed in a rectangular aperture in the mounting surface and is constructed to retain a closed surface when secured in the mounting surface, the module includes a longitudinally extending inwardly projecting segment having the arcuate contour of a longitudinal segment of a cylinder wall, with end walls contoured and connected to the ends of the inwardly projecting segment, and a longitudinally extending cross member centrally spanning the inwardly projecting segment and connected to the end walls, the cross member being adapted to provide a grip or step and the inwardly projecting segment being adapted to provide a recess for receiving the knuckles of a clenched hand or the end of a foot.

7 Claims, 5 Drawing Figures

HANDLE-RUNG MODULE

BACKGROUND OF THE INVENTION

The apparatus of this invention relates to a handle or rung module which is adapted for installation into a mounting surface to provide a handle, hand grip or step. In many applications for example in the stacking of containers or stream lined design of vehicles such as trucks, aircraft or the like, it is desirable to include handles which are both generally flush with the surface and do not provide a breach in the surface to prevent the surface from functioning as an enclosure. Further, it is often desirable to include a handle or rung in the surface of a structure after the structure has already been constructed or fabricated. From these requirements a handle structure has been devised which by simple modification of the surface of conventional structures can be adapted and installed into the structure's surface to provide a handle and/or rung.

SUMMARY OF THE INVENTION

The handle-rung module of this invention comprises a module unit that can be installed on pre-existing structures to provide a hand grip or ladder-rung which is recessed from the surface of the structures. The handle-rung module is constructed with a longitudinally extending inwardly projecting segment having a concave arcuate contour of a longitudinal segment of a cylinder wall. This longitudinal segment has two end walls with a circular peripheral edge portion connected to the ends of the longitudinal segment. Centrally spanning the longitudinal segment is a longitudinally extending cross member having at least one planar outer surface and a arcuately contoured inner surface. The longitudinal segment is connected at each end to the end walls. The outer rectangular peripheral edge formed by side edges of the longitudinal segment and the remaining edge portion of the end walls, excluding the circular peripheral edge portion, is adapted to be attached to the periphery of a rectangular aperture cut into the surface of the pre-existing structure. Preferably, the means for adapting the module to the surface of the structure comprises an integral flange attached to the outer peripheral edge of the module. The flange is attached to the structure's surface by rivets or other conventional fasteners. Alternately, where the surface of the structure is compatible, for example both fabricated from weldable steel, the means for adapting the module to the surface may comprise a weld seam around the outer peripheral edge.

DETAILED DESCRIPTION OF THE PREFERRED EMBODIMENTS

Figure 1:
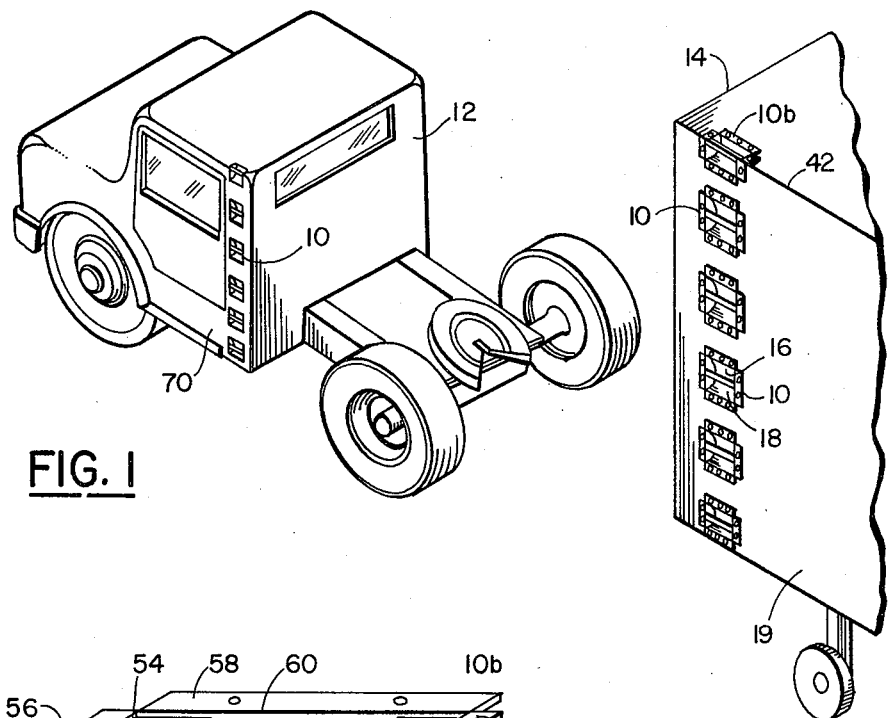
FIG. 1 is a perspective schematic view of the handle-rung modules installed in a tractor-trailer assembly.

Referring to FIG. 1, handle-rung modules, designated generally by the reference numeral 10 are shown installed on the side of both a tractor 12 and trailer 14 to illustrate an exemplar use of the modules. The modules 10 are vertically arranged on both the side of the tractor 12 and trailer 14 in the manner of a ladder to provide access to the side or top of the vehicle units. The modules are mounted substantially flush with the outer surfaces of the vehicle units such that they do not project from the surface to interfere with the use of the vehicle units, which must often be operated in close quarters. Such arrangement also makes the handle-rung units suitable for use where air resistance is to be minimized such as on aircraft.

The modules 10 each include a recessed area 16 and a cross bar 18 permitting a hand or foot to be placed in the recess and on the cross bar for climbing. The construction of modules are shown in greater detail with reference to FIGS. 2–5.

Figure 3:
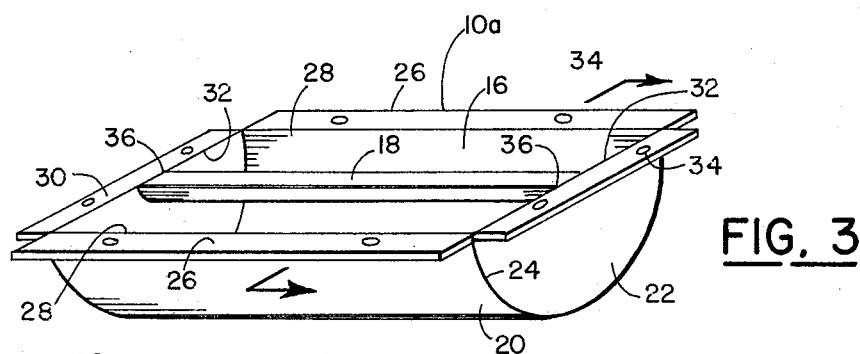
FIG. 3 is a perspective view of a handle-rung module for side use.

Referring to FIG. 3, one embodiment 10A of the modules is shown in greater detail. This embodiment is adapted for attachment to a generally flat surface such as to the side 19 of the trailer as shown in FIG. 1. The handle-rung module 10A of FIG. 3 includes a longitudinally extending inwardly projecting segment 20 which forms the protective recess 16 of the module. The longitudinal segment 20 has the arcuate contour of a longitudinal segment of a cylinder wall. End walls 22 formed of half circular disks are connected to the longitudinal segment along common edge 24.

In the embodiment of FIG. 3, the longitudinal segment 20 includes flanges 26 at the top longitudinal edges 28. Similarly the end walls 22 include flanges 30 at the top straight edge 32. The construction is such that the module is essentially symmetrical, the longitudinal segment having arcuate end edges 24A and parallel straight side edges 28. The end walls have arcuate edges 24B, which are joined to the arcuate end edges 24A to form the common edge 24. The straight edges 32 at the top of the end walls 22 are coplanar with the parallel straight side edges of the longitudinal segment. The flanges 26 and 30 are arranged in a planar configuration and are adapted to be attached to a flat surface by rivets 33, bolts or other conventional fasteners, when the module is installed in a rectangular aperture defined generally in size by the top longitudinal edges of the longitudinal segment and the top straight edges of the end walls. When rivets or bolts are employed, the flanges 26 and 28 are provided with spaced holes 34 in the flanges 26 and 30 to facilitate attachment to a supporting surface such as the side 19 of the trailer shown in FIG. 1.

Figures 4, 5:
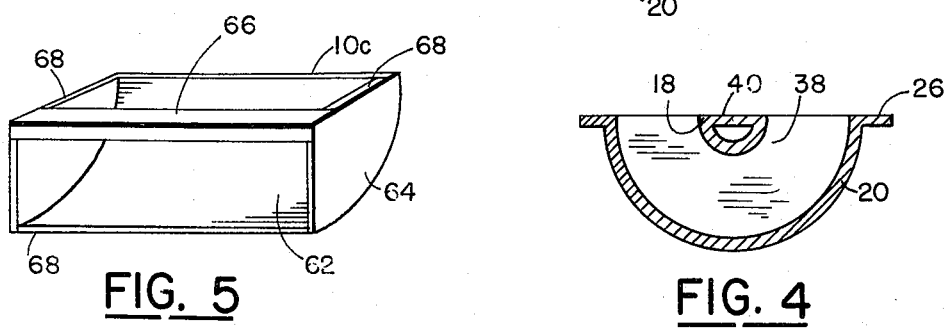
FIG. 4 is a cross sectional view of the handle-rung module of FIG. 3.
FIG. 5 is a perspective view of a modified embodiment of a handle-rung module.

The longitudinally extending cross bar 18 centrally spans the longitudinal segment 20 and is connected at each end 36 to the transverse end walls 22. The configuration and arrangement of the cross bar 18 is shown in greater detail in FIG. 4. Referring to FIG. 4, the cross bar 18 has a semi-circular cross section with a semi-circular or arcuate surface 38 concentric with the circular contour of the longitudinal segment 20 and a flat portion 40 coplanar with the flanges 26, and hence the straight edges of the end walls and longitudinal segment, to obtain the generally symmetric cross sectional configuration.

Figure 2:
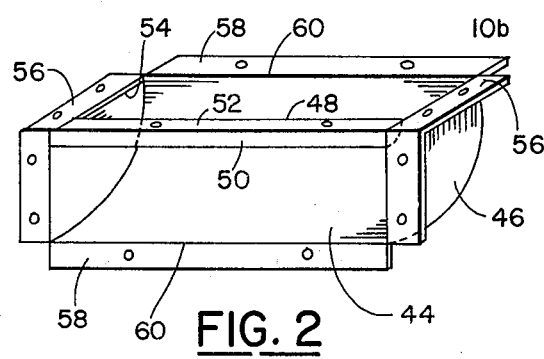
FIG. 2 is a perspective view of a handle-rung module for corner use.

In adapting the handle-rung modules to a corner surface, such as the corner surface 42 at the top of the trailer, n embodiment comprising, in effect, a half module 10B is utilized as shown at the top of the series of modules on the trailer in FIG. 1. This embodiment is shown in greater detail in FIG. 2. The module 10B includes a similar longitudinal segment 44 which forms a protective recess into which the knuckles of the hand are insertable when gripping a cross member. The arcuate concave contour of the longitudinal segment forms a quarter circle, in cross section. The longitudinal segment 44 is joined to transverse, quarter-disc end walls 46. A longitudinally extending cross bar 48 is connected at each end to the end walls 46. The cross bar is constructed and arranged with respect to the end walls 46 and longitudinal segment 44 such that an inner portion of the handle (not visible) has a curved configuration concentric with the longitudinal segment and two flat outer portions 50 and 52 are flush with the straight radial edges 54 of the end walls 46. Each of the two flat outer portions is coplanar with two opposite radial edges of the end walls and one of the straight side or longitudinal edges 60 of the longitudinal segment. The two planes thereby formed intersect at right angles such that a "half" module will be substantially flush with the two intersecting surfaces at the corner of a pre-existing structure as shown in FIG. 1. As shown in FIG. 2 the half module 10B includes flanges 56 at the radial edges 54 of the end walls and flanges 58 on the straight longitudinal edges 60 of the longitudinal segment.

Referring now to FIG. 5, an alternate embodiment of a half module 10C is shown with a circularly contoured longitudinal segment 62, end walls 64, and a cross bar 66. This embodiment is adapted for attachment to surface structures to which the module can be welded along its peripheral edge 68. For example, the tractor in FIG. 1 includes a series of modules welded to the surface 70 of the tractor cab to provide a smoother appearance that presented by the flanged modules.

Each of the embodiments shown is so attached to the surface of an auxiliary structure such that any aperture formed in the surface of a structure is closed by the attached module. In this manner, an enclosure, such as the trailer 14 is preserved.

The handle-rung modules may be adapted for attachment to other pre-existing structures where it is desirable to have a carrying means that is substantially flush with, for example, the surface of a container.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:
1. A handle rung module adapted for attachment in an aperture in a pre-existing structure comprising:
 a. a longitudinal segment of arcuate contour having arcuate end edges and parallel straight side edges;
 b. two substantial parallel end walls each having an arcuate edge portion joined to the arcuate edges of the longitudinal segment at opposite ends of said longitudinal segment;
 c. a longitudinally extending cross member centrally spanning the length of the longitudinal segment, said cross member having ends connected to said end walls proximate to a midpoint on said peripheral edge portion of said end walls; said cross member further having a flat surface and an arcuate surface concentric with said arcuate contour of said longitudinal segment and forming a straight edge longitudinally of said cross member; said flat surface facing outwardly from said arcuate longitudinal segment and;
 d. means at the straight edges of said longitudinal segment and said peripheral edge portions of said end walls attachable to the surface of a pre-existing structure for mounting the module within an aperture in the surface of a pre-existing structure with said longitudinal segment recessed in said surface.

2. The handle-rung module of claim 1 wherein said peripheral edge portion comprises a straight edge, said straight edges of said two end walls and said straight side edges being coplanar, and wherein said flat surface of said cross member is coplanar with said straight edges of said longitudinal segment and said end walls.

3. The structure of claim 2 wherein said mounting means comprises a flange coplanar with said straight edges.

4. A climbing device adapted for permanent attachment in the surface of a pre-existing structure comprising a plurality of handle-rung modules according to claim 2 mountable in a vertical spaced series in the surface of the pre-existing structure.

5. The handle-rung module of claim 1 wherein said peripheral edge portion comprises first and second straight edges intersecting at right angles, said first straight edge of one end wall being parallel to the first straight edge of the opposite end wall said first straight edges being coplanar with a first of the straight side edges of the longitudinal segment and said second straight edge of one end wall being parallel to the second straight edge of the opposite end wall, said second straight edges being coplanar with a second of the straight side edges of the longitudinal segment, and wherein said cross member has further a first flat surface coplanar with said first straight edges of said longitudinal segment and said end walls, a second flat surface coplanar with said second straight edges of said longitudinal segment and said end walls, and an arcuate surface concentric with the arcuate contour of said longitudinal segment.

6. The handle-rung module of claim 4 wherein said mounting means comprises a first flange structure coplanar with said first straight edges and a second flange structure coplanar with said second straight edges.

7. A climbing device adapted for permanent attachment in the surface of a pre-existing structure comprising a plurality of handle-rung modules according to claim 1 mountable in a vertical spaced series in the surface of the pre-existing structure.

* * * * *